United States Patent
Yoon et al.

(10) Patent No.: US 12,128,874 B2
(45) Date of Patent: Oct. 29, 2024

(54) METHOD OF CONTROLLING LIMP HOME DRIVING OF HYBRID VEHICLE

(71) Applicants: HYUNDAI MOTOR COMPANY, Seoul (KR); KIA CORPORATION, Seoul (KR)

(72) Inventors: Gun Seok Yoon, Suwon-si (KR); Chil Seong Park, Anyang-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 295 days.

(21) Appl. No.: 17/681,486

(22) Filed: Feb. 25, 2022

(65) Prior Publication Data

US 2022/0379875 A1 Dec. 1, 2022

(30) Foreign Application Priority Data

May 31, 2021 (KR) .................. 10-2021-0069715

(51) Int. Cl.
  *B60W 20/40* (2016.01)
  *B60W 20/20* (2016.01)
  *B60W 50/12* (2012.01)

(52) U.S. Cl.
  CPC ............ *B60W 20/40* (2013.01); *B60W 20/20* (2013.01); *B60W 50/12* (2013.01); *B60W 2510/081* (2013.01); *B60W 2510/085* (2013.01)

(58) Field of Classification Search
  CPC ...... B60W 20/40; B60W 20/20; B60W 50/12; B60W 2510/081; B60W 2510/085
  See application file for complete search history.

(56) References Cited

U.S. PATENT DOCUMENTS

| | | | | |
|---|---|---|---|---|
| 5,428,274 A | * | 6/1995 | Furutani | B60K 6/46 903/917 |
| 2005/0135133 A1 | * | 6/2005 | Maehara | H02J 7/243 363/144 |
| 2006/0038406 A1 | * | 2/2006 | Hino | B60R 16/03 290/40 C |
| 2006/0152180 A1 | * | 7/2006 | Tahara | B60K 6/44 318/139 |
| 2007/0200529 A1 | * | 8/2007 | Kaneko | B60L 50/61 318/801 |
| 2009/0255744 A1 | * | 10/2009 | Kitano | B60K 6/365 180/65.285 |
| 2016/0121881 A1 | * | 5/2016 | Kim | B60W 10/02 180/65.265 |
| 2017/0129478 A1 | * | 5/2017 | Minegishi | B60L 50/16 |
| 2017/0163195 A1 | * | 6/2017 | Omata | H02P 29/0241 |
| 2017/0240160 A1 | * | 8/2017 | Park | B60W 10/08 |
| 2018/0351398 A1 | * | 12/2018 | Tang | H02J 7/1423 |
| 2019/0135102 A1 | * | 5/2019 | Meguro | B60W 20/20 |
| 2021/0070193 A1 | * | 3/2021 | Tanaka | B60L 58/12 |
| 2022/0216820 A1 | * | 7/2022 | Fukunaga | B60L 50/60 |

* cited by examiner

*Primary Examiner* — Justin S Lee
(74) *Attorney, Agent, or Firm* — Morgan, Lewis & Bockius LLP

(57) ABSTRACT

The present disclosure is to provide a method of controlling limp home driving of a hybrid vehicle. When the hybrid vehicle enters into a limp home driving mode with a starter generator malfunctioning, a motor control unit performs constant voltage control on counter electromotive force of a motor, so that a constant voltage is supplied to high-voltage components as an input voltage, thereby ensuring that high-voltage components are protected and operable.

7 Claims, 3 Drawing Sheets

METHOD OF CONTROLLING LIMP HOME DRIVING OF HYBRID VEHICLE

CROSS-REFERENCE TO RELATED APPLICATION

This application claims the benefit of priority to Korean Patent Application No. 10-2021-0069715 filed on May 31, 2021 in the Korean Intellectual Property Office, the entire contents of which are incorporated herein by reference.

TECHNICAL FIELD

The present disclosure relates to a method of controlling limp home driving of a hybrid vehicle and more specifically, to a method of controlling limp home driving of a hybrid vehicle in which, when the hybrid vehicle enters into a limp home driving mode with a starter generator malfunctioning, constant voltage control may be performed using a motor so as to ensure that high-voltage components are protected and operable.

BACKGROUND

A hybrid vehicle refers to an environmentally friendly vehicle using a motor drive source as an auxiliary power source in addition to an engine in order to reduce exhaust gas and improve fuel efficiency.

As illustrated in FIG. 1, a power train of a hybrid vehicle may include an engine 10, a motor 20, an engine clutch 30 disposed between the engine 10 and the motor 20 to engage or disengage the transmission of engine power, a transmission 40 configured to output the power to a drive shaft 60 for driving by shifting the power, a hybrid starter generator (HSG) 50, a type of motor, connected to a crank pulley of the engine 10 to enable engine start and power generation, a high-voltage battery 70 connected to the motor 20 and the HSG 50 through a main relay 90 in a chargeable and dischargeable manner, and the like.

In addition, a first inverter 81 for motor driving control is connected to the motor 20 and the main relay 90, and a second inverter 82 for HSG driving control is connected to the HSG 50 and the main relay 90.

The engine clutch 30 is engaged or disengaged by a clutch actuator on/off-controlled by a hybrid control unit (HCU), i.e., the highest-level control unit of the hybrid vehicle.

The transmission 40 may be implemented as a dual clutch transmission (DCT). The transmission 40 has an electric oil pump (EOP) 42 mounted thereon. The EOP 42 is a high-voltage component driven using the power of the high-voltage battery 70.

Thus, in response to the operation of the EOP 42, working hydraulic pressure of friction elements of the transmission 40 may be formed.

When the above-described hybrid vehicle enters "limp home" driving mode, i.e., emergency driving mode, it is aimed to launch the vehicle using engine power by a control process of maintaining the clutch of the transmission having low heat capacity in a closed state, i.e., an engaged state, and slipping and locking the clutch of the engine having higher heat capacity.

Here, when entering into the limp home driving mode using the engine power, the main relay is controlled to be turned off by the HCU and the like for protection of high-voltage components and for safety.

In addition, considering that the HSG connected to the engine is driven at a predetermined or higher RPM in the entire range of the limp home driving mode in the operation of the engine, typical pulse width modulation (PWM) control for constant voltage control is performed on the HSG. Consequently, a constant voltage produced by the power generation of the HSG may be supplied to high-voltage components (e.g., an electric oil pump and a motor control unit) as an input voltage.

In other words, performing the constant voltage control on the HSG by the PWM control may refer to a control operation of causing a voltage produced by the power generation of the HSG to be constant. The constant voltage produced by the power generation of the HSG may be supplied to the high-voltage components (e.g., an electric oil pump and a motor control unit) as an input voltage.

Here, the input voltage to the high-voltage components is maintained to be constant by the constant voltage control in order to prevent the high-voltage components from being damaged by an overvoltage or being inoperable by a low voltage in the limp home driving mode.

However, when entering the limp home driving mode with the HSG malfunctioning, the following problems may occur.

When the HSG malfunctions, it is impossible to perform the constant voltage control. Thus, a motor control unit may perform diode rectification control so that a current produced from the counter electromotive force of the motor, defined by the multiplication of the speed of the motor with magnetic flux, is a constant current. The constant current produced by the diode rectification control may be supplied to the high-voltage components through a DC-link capacitor of the first inverter included in the motor control unit.

However, since the counter electromotive force of the motor varies depending on the speed of the motor, even in the case that the diode rectification control is performed, the input voltage supplied to the high-voltage components through the DC-link capacitor may be an overvoltage higher than the constant voltage or a low voltage lower than the constant voltage.

For example, during high speed driving of the vehicle, when the motor connected to the engine is in a high-RPM state in which the speed of the motor is higher than a predetermined level, an overvoltage may be input to the high-voltage components as high-voltage counter electromotive force from the motor is accumulated in the DC-link capacitor. Consequently, the high-voltage components, such as an EOP, may be damaged, which is problematic.

In contrast, in the engine idling state, when the motor connected to the engine is in a low-RPM state in which the speed of the motor is lower than the predetermined level, a low voltage may be input to the high-voltage components as counter electromotive force having a voltage lower than a predetermined level from the motor is accumulated in the DC-link capacitor. A sufficient voltage for the operation of the high-voltage components, such as an EOP, may not be provided. Consequently, the EOP cannot form the working hydraulic pressure of the transmission, thereby causing the vehicle to become inoperable, which is problematic.

The information disclosed in the Background section above is to aid in the understanding of the background of the present disclosure, and should not be taken as acknowledgement that this information forms any part of prior art.

SUMMARY OF THE DISCLOSURE

The present disclosure has been made in an effort to solve the above-described problem associated with the related art, and an objective of the present disclosure is to provide a method of controlling limp home driving of a hybrid vehicle in which, when the hybrid vehicle enters into a limp home driving mode with a starter generator malfunctioning, a motor control unit may perform constant voltage control on counter electromotive force of a motor, so that a constant voltage may be supplied to high-voltage components as an input voltage, thereby ensuring that high-voltage components are protected and operable.

In order to achieve one of the above-described objectives, the present disclosure provides a method of controlling limp home driving of a hybrid vehicle, which includes: engaging an engine clutch and turning a main relay off when the hybrid vehicle enters limp home driving mode; determining whether or not a hybrid starter generator malfunctions; and when the hybrid starter generator malfunctions, performing, by a motor control unit, a pulse width modulation (PWM) control for a constant voltage control on counter electromotive force of a motor.

When the constant voltage control by the PWM control is performed on the counter electromotive force of the motor, a constant voltage may be accumulated in a DC-link capacitor of a first inverter included in the motor control unit, and thereafter, be supplied to high-voltage components as an input voltage.

When the hybrid starter generator does not malfunction, the PWM control for the constant voltage control may be performed on counter electromotive force of the hybrid starter generator.

When the constant voltage control by the PWM control is performed on the counter electromotive force of the hybrid starter generator, a constant voltage due to the constant voltage control may be accumulated in a DC-link capacitor through a second inverter, and thereafter, be supplied to the high-voltage components as an input voltage.

In addition, the method may further include, after the performing a PWM control for a constant voltage control on counter electromotive force of a motor, determining whether or not a speed of the motor is below a reference speed value according to driving conditions.

Particularly, in the determining whether or not a speed of the motor is below a reference speed value according to driving conditions, when a deceleration speed of the vehicle is higher than or equal to a reference deceleration value, the engine clutch may be disengaged, or a transmission may be upshifted, the speed of the motor may be determined to be below the reference speed value.

When the speed of the motor is determined to be below the reference speed value, the motor control unit may stop the PWM control for the constant voltage control on the counter electromotive force of the motor and perform a diode rectification control.

Particularly, after the entrance into the diode rectification control, when the speed of the motor returns to a value higher than or equal to the reference speed value for the constant voltage control, the performing a PWM control for a constant voltage control on counter electromotive force of a motor may be repeated.

According to the above-described embodiments, the present disclosure provides the following effects.

First, when the starter generator malfunctions in entrance into the limp home driving mode, the motor control unit may perform constant voltage control on the counter electromotive force of the motor, so that a constant voltage may be supplied to high-voltage components as an input voltage, thereby ensuring that the high-voltage components are protected and operable.

Second, in a situation in which a constant voltage from the high-voltage battery due to turning-off of the main relay cannot be supplied to the EOP, i.e., a high-voltage component, in the limp home driving mode, the counter electromotive force of the motor resulting from the operation of the engine may be supplied to the EOP, i.e., a high-voltage component, as a constant input voltage by the constant voltage control. Consequently, working hydraulic pressure of the transmission may be easily generated due to smooth operation of the EOP.

Third, in a situation in which a constant voltage from the high-voltage battery cannot be supplied to the EOP, i.e., a high-voltage component, due to the turning-off of the main relay in the limp home driving mode, when the motor control unit malfunctions while the starter generator functions properly, the counter electromotive force of the starter generator resulting from the operation of the engine may be supplied to the EOP, i.e., a high-voltage component, as a constant input voltage by the constant voltage control. Consequently, working hydraulic pressure of the transmission may be easily generated due to smooth operation of the EOP.

BRIEF DESCRIPTION OF THE DRAWINGS

The above and other features of the present disclosure will now be described in detail with reference to certain exemplary examples thereof illustrated in the accompanying drawings which are given herein below by way of illustration only, and thus are not limitative of the present disclosure, and wherein.

DETAILED DESCRIPTION

Hereinafter, the present disclosure will be described in detail with reference to the accompanying drawings.

Figure 1:
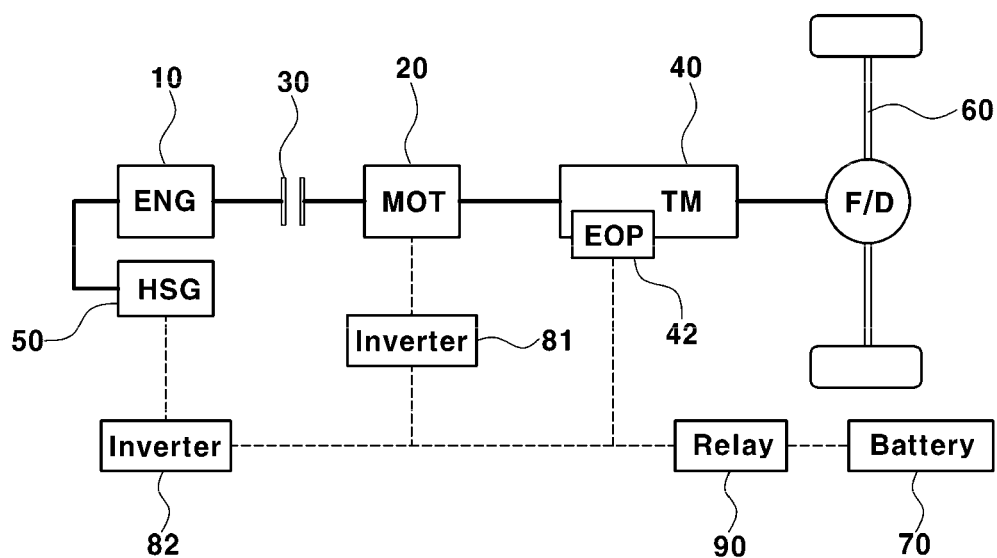
FIG. 1 is a diagram illustrating a power train of a hybrid vehicle.

As described above with reference to FIG. 1 of the accompanying drawings, a power train of a hybrid vehicle includes an engine 10, a motor 20, an engine clutch 30 disposed between the engine 10 and the motor 20 to engage or disengage the transmission of engine power, a dual clutch-type transmission 40 configured to output the power to a drive shaft 60 for driving by shifting the power, a hybrid starter generator (HSG) 50, a type of motor, connected to a crank pulley of the engine 10 to enable engine start and power generation, a high-voltage battery 70 connected to the motor 20 and the HSG 50 through a main relay 90 in a chargeable and dischargeable manner, and the like.

In addition, a first inverter 81 of a motor control unit for motor driving control is connected to the motor 20 and the relay 90, and a second inverter 82 for HSG driving control is connected to the HSG 50 and the main relay 90.

In addition, an electric oil pump (EOP) 42, i.e., a high-voltage component driven using the voltage of the high-voltage battery 70, is mounted on the transmission 40.

The present disclosure is characterized in that, in a situation in which the hybrid vehicle including the above-described configuration enters limp home driving mode, when the starter generator malfunctions, the motor control unit may perform constant voltage control on counter electromotive force of the motor so that a constant voltage may be supplied to high-voltage components as an input voltage, thereby ensuring that the high-voltage components, such as the EOP, are protected and operable.

Figure 2:
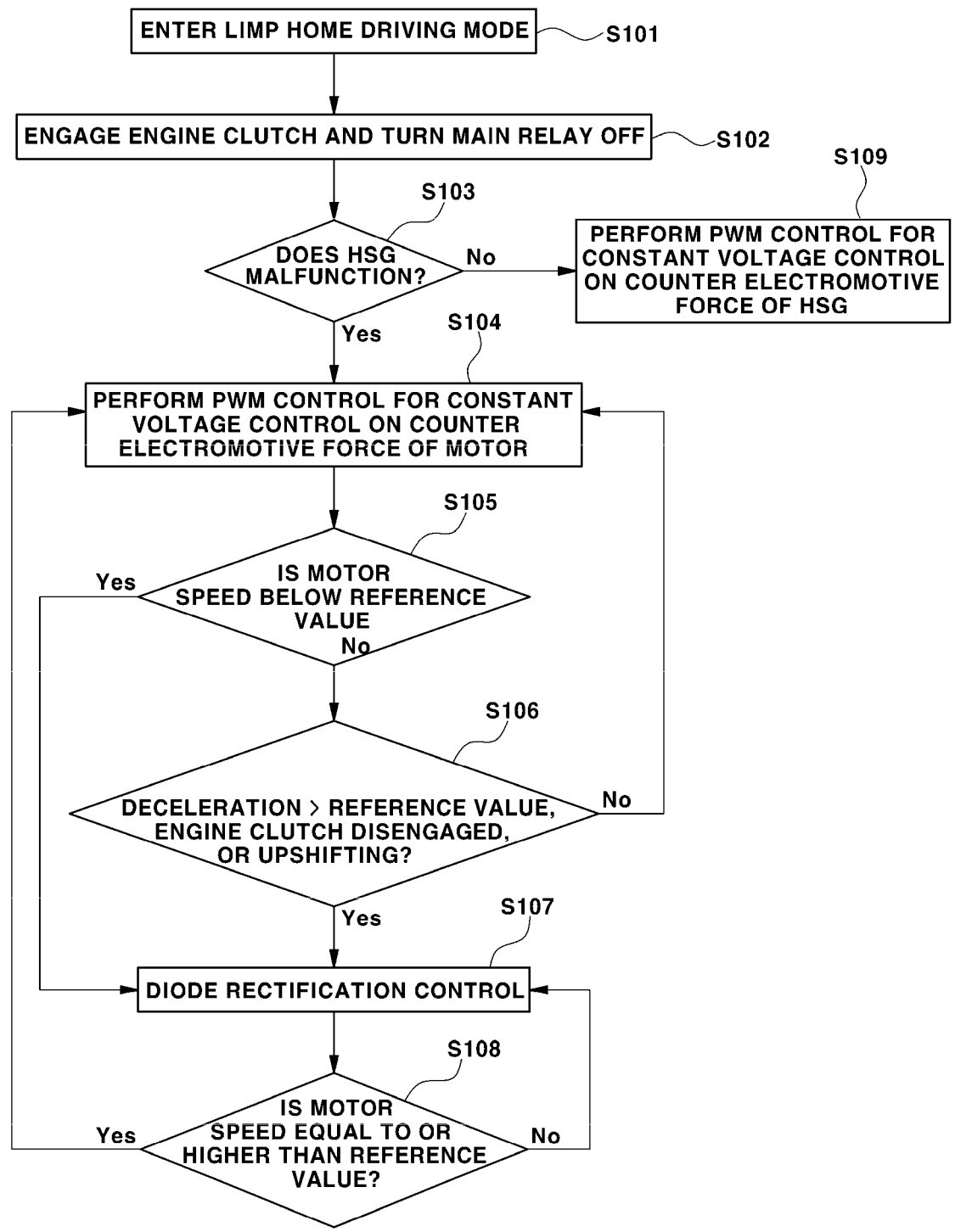
FIG. 2 is a flowchart illustrating a method of controlling limp home driving of a hybrid vehicle according to the present disclosure.

FIG. 2 is a flowchart illustrating a method of controlling limp home driving of a hybrid vehicle according to the present disclosure.

First, the hybrid vehicle enters limp home driving mode in S101.

For example, when a control unit or the like for controlling chassis components, such as body control unit (BCM), malfunctions, entrance into the limp home driving mode, i.e., emergency driving mode in which only engine driving force is used to protect the high-voltage components, such as a motor, may be performed.

In this regard, the engine clutch 30 arranged between the engine 10 and the motor 20 is engaged and, at the same time, is controlled to be turned off in S102.

More specifically, the engine clutch 30 arranged between the engine 10 and the motor 20 is engaged under the control of the HCU, i.e., the highest-level control unit of the hybrid vehicle, and the main relay 90 is off-controlled by the HCU to protect the high-voltage components, such as the motor and the EOP. Consequently, the supply of the voltage to the motor 20, the HSG 50, and the like from the high-voltage battery 70 is stopped.

In contrast, as the main relay 90 is turned off, a voltage may not be reliably supplied to the high-voltage components. Furthermore, when the EOP is not supplied with a rated operating voltage, pumping driving force of the EOP may be reduced. This may make it impossible to form a hydraulic pressure for the shifting operation of the transmission, thereby making the driving of the vehicle impossible. Thus, a voltage generated from counter electromotive force of the starter generator or the motor must be supplied to the EOP.

As a subsequent step for this purpose, whether or not the HSG 50 malfunctions is determined in S103.

For example, when the snapping of a power cable of the starter generator, i.e., a type of motor, the malfunction of a current sensor or a temperature sensor of the starter generator, the malfunction of the second inverter for the starter generator, or the like is detected, the HCU determines that the starter generator malfunctions.

Subsequently, when the HSG 50 is determined to malfunction, the first inverter 81 included in the motor control unit performs pulse width modulation (PWM) control for constant voltage control on the counter electromotive force of the motor in S104.

That is, as the counter electromotive force is generated from the rotation of the motor as the driving force of the engine 10 is transferred to the motor 20 in a state in which the engine clutch 30 is engaged, the PWM control for constant voltage control is performed on the counter electromotive force of the motor in S104.

For reference, the operation of performing the constant voltage control on the counter electromotive force of the motor by the PWM control refers to a control operation of converting the counter electromotive force of the motor to a constant voltage. Here, the pulse width of the PWM control for producing the constant voltage may be determined by experiments.

Figure 3:
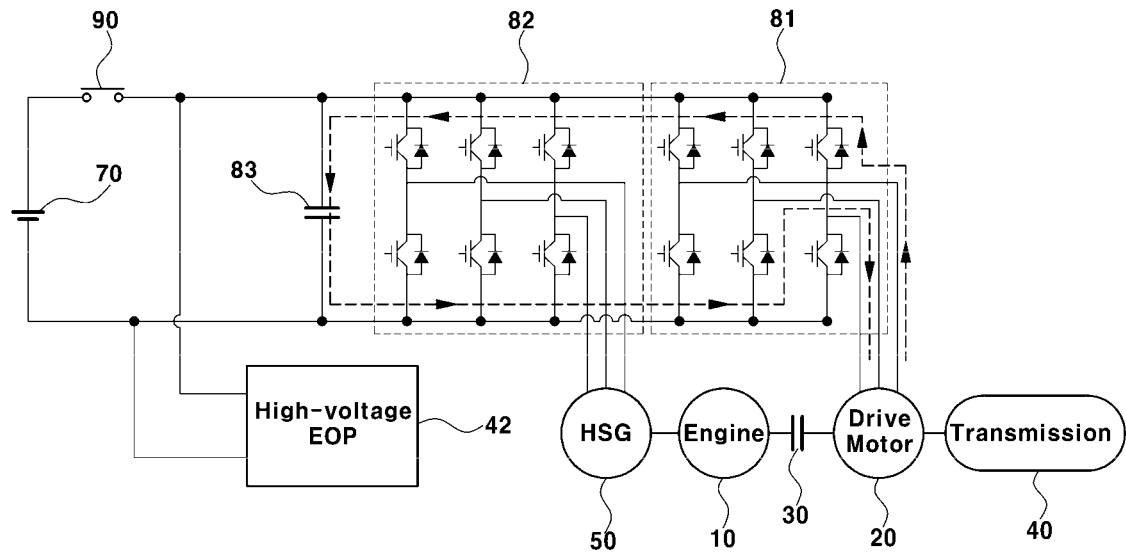
FIG. 3 is a diagram illustrating a flow of counter electromotive force of the motor supplied to the DC-link capacitor and the high-voltage components by constant voltage control in the method of controlling limp home driving of a hybrid vehicle according to the present disclosure.

Thus, when the constant voltage control is performed on the counter electromotive force of the motor by the PWM control, a constant voltage is accumulated in a DC-link capacitor 83 through the first inverter 81 included in the motor control unit, as illustrated in FIG. 3. The accumulated constant voltage may be supplied to the high-voltage components as an input voltage.

For example, as illustrated in FIG. 3, the constant voltage accumulated in the DC-link capacitor 83 may be supplied to an electric water pump 42 among the high-voltage components.

As described above, when entering into the limp home driving mode with the HSG 50 malfunctions, the first inverter 81 of the motor control unit may perform constant voltage control on counter electromotive force of the motor so that a constant voltage may be supplied to the high-voltage components as an input voltage, thereby ensuring that the high-voltage components are protected and operable.

In addition, in a situation in which the constant voltage of the high-voltage battery due to the turning-off of the main relay 90 in the limp home driving mode cannot be supplied to the EOP 42, i.e., a high-voltage component, the counter electromotive force of the motor resulting from the operation of the engine may be supplied to the EOP 42, i.e., a high-voltage component, as a constant input voltage by the constant voltage control. Thus, working hydraulic pressure of the transmission may be easily generated due to smooth operation of the EOP, and the supply of oil to respective friction elements on shift elements of the transmission may be maintained.

In addition, after the step of performing the PWM control for the constant voltage control on the counter electromotive force of the motor, a step S105 of determining whether or not the speed of the motor is below a reference speed value according to driving conditions may further be performed.

That is, since a direct variable for the constant voltage control using the counter electromotive force of the motor is the speed (RPM) of the motor being equal to or higher than the reference speed value, the speed of the motor is required to be equal to or higher than the reference speed value. When the speed of the motor is below the reference speed value, it is difficult to perform the constant voltage control. Thus, the step of determining whether or not the speed of the motor is below the reference speed value (e.g., the minimum RPM of the motor for the constant voltage control) according to driving conditions may further be performed.

Particularly, when a deceleration speed of the vehicle is equal to or higher than a reference deceleration value, the engine clutch is disengaged, or the transmission is upshifted (e.g., the gear stage of the transmission is shifted to an upper stage) accidently in the step of determining whether or not the speed of the motor is below the speed reference value according to driving conditions, the speed of the motor is determined to be below the reference speed value in S106.

Responsively, when the speed of the motor is determined to be below the reference speed value, the motor control unit stops the PWM control for the constant voltage control on the counter electromotive force of the motor and performs diode rectification control in S107.

Particularly, after the entrance into the diode rectification control, whether or not the speed of the motor has returned to a value equal to or higher than the reference speed value for the constant voltage control is determined in S108. When the speed of the motor is determined to have returned to the value equal to or higher than the reference speed value for the constant voltage control in the determination step S108, the step S104 of performing the PWM control for the constant voltage control on the counter electromotive force of the motor may be performed again.

In addition, when the HSG 50 is not determined to malfunction in the step S103, PWM control for constant voltage control on counter electromotive force of the HSG 50 connected to the engine may be performed in S109.

For example, when the motor control unit malfunctions while the starter generator functions properly, the driving force of the engine 10 is transferred to the HSG 50 in a state in which the engine clutch 30 is engaged, thereby generating counter electromotive force in response to the rotation of the starter generator. The PWM control for the constant voltage control on the counter electromotive force of the starter generator may be performed.

Figure 4:
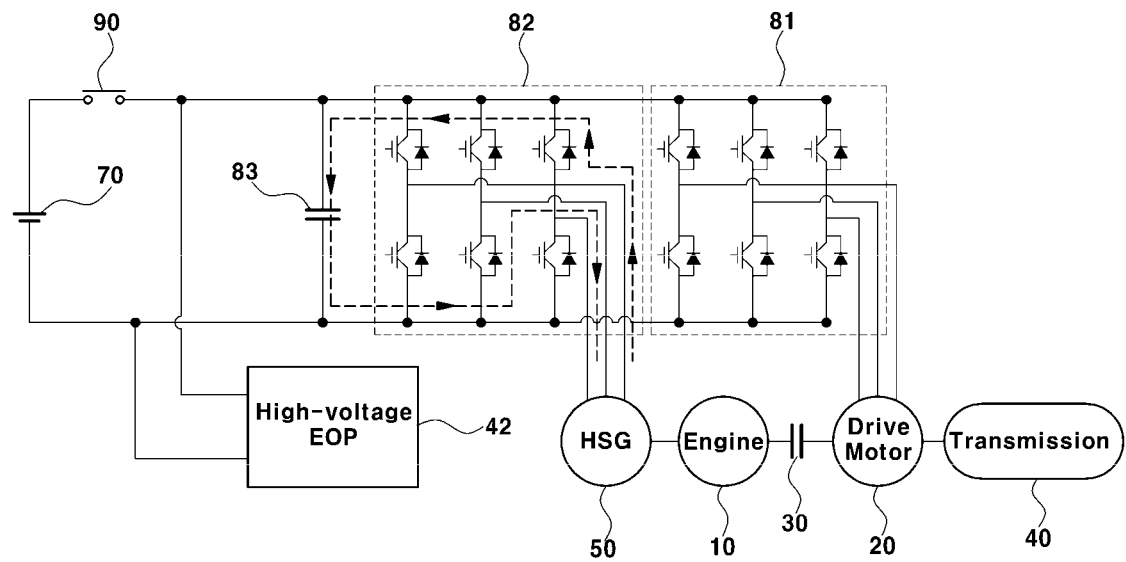
FIG. 4 is a diagram illustrating a flow of counter electromotive force of the starter generator supplied to the DC-link capacitor and the high-voltage components by constant voltage control in the method of controlling limp home driving of a hybrid vehicle according to the present disclosure.

Thus, when the constant voltage control is performed on the counter electromotive force of the HSG 50 by the PWM control, a constant voltage is accumulated in the DC-link capacitor 83 through the second inverter 82 due to the constant voltage control, as illustrated in FIG. 4. The constant voltage accumulated may be supplied as an input voltage to the high-voltage components.

For example, as illustrated in FIG. 4, the constant voltage accumulated in the DC-link capacitor 83 may be supplied to the electric water pump 42 among the high-voltage components.

In addition, in a situation in which the constant voltage of the high-voltage battery cannot be supplied to the EOP 42, i.e., a high-voltage component, due to the turning-off of the main relay 90 in the limp home driving mode, the counter electromotive force of the starter generator resulting from the operation of the engine may be supplied to the EOP 42, i.e., a high-voltage component, as a constant input voltage by the constant voltage control. Accordingly, working hydraulic pressure of the transmission may be easily generated due to smooth operation of the EOP, and the supply of oil to respective friction elements of the shift elements of the transmission may be maintained.

Although the exemplary embodiments of the disclosure have been described in detail for illustrative purposes, it should be understood that the scope of the disclosure is not limited by the aforementioned exemplary embodiments and various modifications and improvements are possible to those skilled in the art, without departing from the fundamental principle of the disclosure as defined in the accompanying claims.

What is claimed is:

1. A method of controlling limp home driving of a hybrid vehicle, the method comprising:

engaging an engine clutch and turning a main relay off when the hybrid vehicle enters a limp home driving mode;

determining whether or not a hybrid starter generator malfunctions;

when the hybrid starter generator malfunctions, performing, by a motor control unit, a pulse width modulation (PWM) control for a constant voltage control on counter electromotive force of a motor; and after the performing of the PWM control for the constant voltage control on the counter electromotive force of the motor, determining whether or not a speed of the motor is below a reference speed value according to driving conditions, wherein, when the speed of the motor is determined to be below the reference speed value, the motor control unit performs a diode rectification control.

2. The method of claim 1, wherein, when the constant voltage control by the PWM control is performed on the counter electromotive force of the motor, a constant voltage is accumulated in a DC-link capacitor of a first inverter included in the motor control unit, and thereafter, is supplied to high-voltage components as an input voltage.

3. The method of claim 1, wherein, when the hybrid starter generator does not malfunction, the PWM control for the constant voltage control is performed on counter electromotive force of the hybrid starter generator.

4. The method of claim 3, wherein, when the constant voltage control by the PWM control is performed on the counter electromotive force of the hybrid starter generator, a constant voltage due to the constant voltage control is accumulated in a DC-link capacitor through a second inverter, and thereafter, is supplied to high-voltage components as an input voltage.

5. The method of claim 1, wherein, in the determining whether or not the speed of the motor is below the reference speed value according to the driving conditions, when a deceleration speed of the vehicle is higher than or equal to a reference deceleration value, the engine clutch is disengaged, or a transmission is upshifted, the speed of the motor is determined to be below the reference speed value.

6. The method of claim 5, wherein, when the speed of the motor is determined to be below the reference speed value, the motor control unit stops the PWM control for the constant voltage control on the counter electromotive force of the motor.

7. The method of claim 6, wherein, after the entrance into the diode rectification control, when the speed of the motor returns to a value higher than or equal to the reference speed value for the constant voltage control, the performing of the PWM control for the constant voltage control on the counter electromotive force of the motor is repeated.

\* \* \* \* \*